May 28, 1968   C. V. McCLOUD   3,385,205
HALF-BUN BAKING PAN
Filed Oct. 21, 1965

CHESTER V. McCLOUD
*INVENTOR.*

BY

*Robert K. Rhea*
AGENT 3,385,205
HALF-BUN BAKING PAN
Chester V. McCloud, 2354 NW. 18th St.,
Oklahoma City, Okla. 73107
Filed Oct. 21, 1965, Ser. No. 499,254
2 Claims. (Cl. 99—439)

ABSTRACT OF THE DISCLOSURE

A metallic sheet having dough displacing recesses struck out of the material is concentrically superposed on a similar plate having dough containing recesses struck out of its material of larger dimension than the dough displacing recesses. Apertures in the top sheet, surrounding the dough displacing recesses, vent trapped air.

---

The present invention relates to the bakers art and more particularly to a baking pan.

Buns presently provided by bakers are usually sliced or cut in half for the reception of meat, such as wieners, pickles, onions or other fillers. Since the bun is cut in half the two planes formed thereby are not conducive to the reception of the meat or other ingredients, therefore, resulting in a loss of some of the ingredients or the necessity of keeping the sandwich partially wrapped while eating. So far as I know the prior art does not disclose or claim a means for forming and baking a half-bun having a recess therein for the reception of the ingredients to form a sandwich.

It is, therefore, the principal object of this invention to provide a baking pan means designed to form buns in longitudinal half sections, each section having a recess or well therein so that two of the half-buns may be placed together and surround, at their marginal edges, meat and other fillers received by the recess in the two half-buns.

A similarly important object is to provide a half-bun baking pan means which eliminates the additional expense of slicing whole buns.

Another object is to provide a half-bun baking pan means wherein a plurality of half-buns may be formed of uniform size and shape permitting any two half-buns to be placed together to form a whole bun in outward appearance.

The present invention accomplishes these and other objects by providing a sheet having at least one dough receiving recess struck out of or formed therein forming a receptacle and a shaping lid or top sheet superposed on the receptacle having a wall forming a recess concentrically entering the recess formed in the receptacle.

Other objects will be apparent from the following description when taken in conjunction with the accompanying single sheet of drawings, wherein.

Like characters of reference designate like parts in those figures of the drawings in which they occur.

In the drawings.

Figure 1:
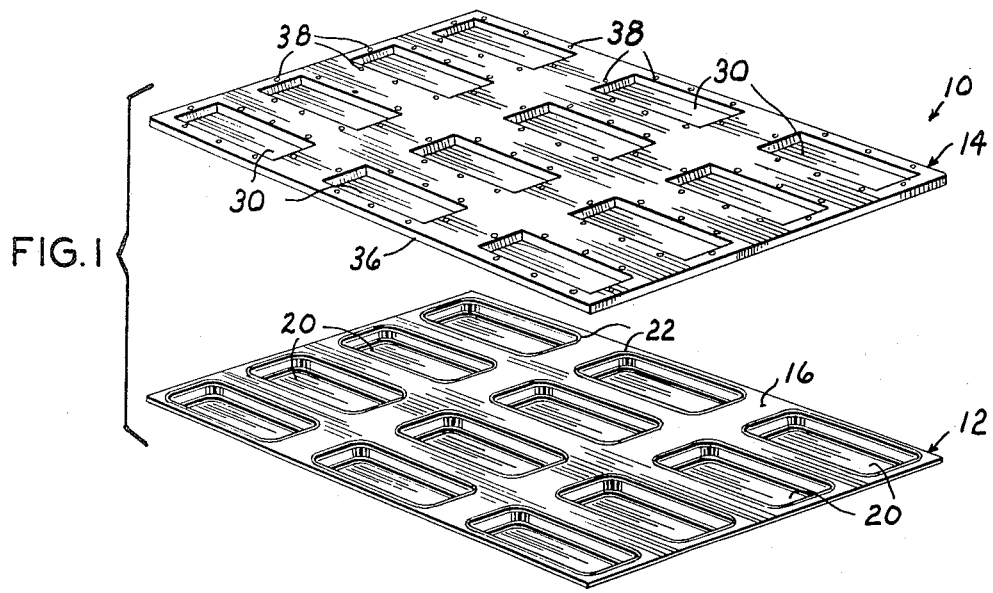
FIGURE 1 is an exploded perspective view of the receptacle and shaping lid.

The reference numeral 10 indicates the device, as a whole, comprising a receptacle or means 12 and a top or shaping lid portion 14. The receptacle 12 is formed of a relatively thin sheet of material, rectangular in general configuration, having a top surface 16 and a lower or bottom surface 18. A plurality of rows of spaced-apart recesses 20 are formed in the receptacle 12 by deflecting the plane of the sheet 12 downwardly beyond the plane of the bottom surface 18. Each recess, in the example shown, is flat bottomed rectangular and is characterized by arcuate corners, as at 22, downwardly converging walls 24 and arcuate edges where the walls 24 join with the plane of the sheet 12, surrounding each recess and forming the bottom thereof, as at 26 and 28, for the reasons presently explained.

Figure 2:
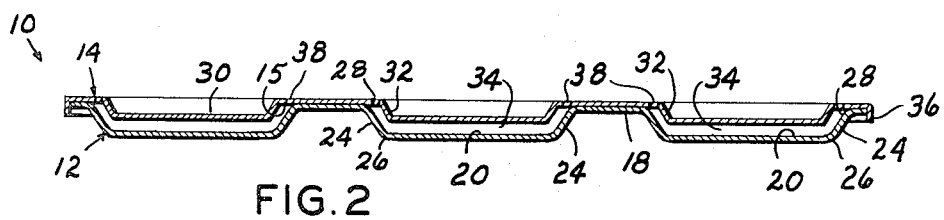
FIGURE 2 is a vertical cross-sectional view, to a larger scale, taken longitudinally of the receptacle and shaping lid in operative position; and, FIGURE 3 is a vertical cross-sectional view, to a similar scale, taken transversely of the assembled receptacle and lid.
Figure 3:
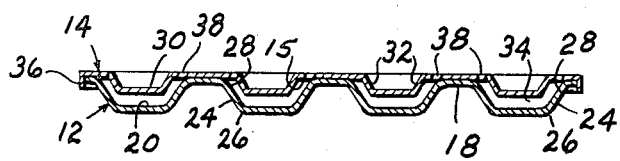

The top or shaping lid 14 is similarly formed of a relatively thin sheet of material of substantially equal dimensions with respect to the receptacle 12. The lid is similarly provided with a plurality of rows of rectangular spaced-apart indentations or recesses 30 complementarily formed for reception within the receptacle recesses 20 when the lid 14 is superposed thereon. The recesses 30 are similarly defined by downwardly converging walls 32 and are of less overall dimensions, including depth, than the recesses 20 so that when the lid 14 is superposed on the receptacle a space or void 34 is created between the surfaces defining the bottom of the recesses 20 and 30 between the walls 24 and 32 thereof. As seen in FIGS. 2 and 3 that portion of the void 34, formed by the spaced-apart recess walls 24 and 32, terminates upwardly in a common plane formed by the bottom surface 15 of the lid in that area surrounding each recess 30. This space or void 34 is the area to be occupied by the bun forming dough as hereinafter explained.

The lid 14 is provided with a depending wall 36 around its marginal edges which surrounds, in slidable contacting relation, the marginal edges of the receptacle 12 when the lid is superposed on the receptacle. The purpose of the wall 36 is to insure that the lid is in register with the receptacle 12 so that the recesses 20 and 30 will be concentrically positioned. The lid 14 is further provided with a plurality of relatively small air vents or apertures 38 punched or drilled through the sheet material adjacent the marginal edges of each recess 30.

Operation

In operation the recesses of the receptacle 12 are each filled with the desired quantity of bun forming dough, not shown, and the lid 14 is superposed on the receptacle 12 as explained hereinabove and shown in FIGS. 2 and 3. The top surface 16 of the receptacle 12, defining the spacing between the recesses 20, contiguously contacts the cooperating lower surface 15 of the lid 14. Air trapped between the receptacle 12 and lid 14 escapes through the apertures 38.

The assembled baking pan and the dough are then baked in an oven, not shown. The half-buns thus formed have overall outside dimensions conforming to the size and arcuate wall configuration of the receptacle recesses 20. The longitudinal and transverse cross-sectional configuration of the half-bun is shown by the shape of the voids 34 in FIGS. 2 and 3, respectively. The recesses 30 in the lid thus form a recess in each half-bun having a configuration conforming to the bottom surface of the material forming the respective recess 30. The half-buns thus formed each have wall areas conforming to that portion of the void 34 lying between the recess walls 24 and 32. When two of the half-buns are placed together with their wall edges, formed by the lid lower surface 15, in register, they form a whole bun having a concealed food receiving recess therebetween.

Obviously the invention is susceptible to some change or alteration without defeating its practicability, and I therefore do not wish to be confined to the embodiment shown in the drawings and described herein, further than I am limited by the scope of the appended claims.

I claim:
1. A half-bun baking pan, comprising: a receptacle, said receptacle comprising a thin metallic sheet having an intermediate substantially rectangular disposed portion projecting beyond the plane of its other surface and forming a dough receiving recess; a shaping lid superposed on said receptacle, said lid comprising a thin metallic sheet having an intermediate substantially rectangular disposed portion projecting beyond the plane of its other surface to form a dough displacing recess of less overall dimension than the recess in said receptacle and projecting toward the recess in said receptacle, said lid having a plurality of apertures surrounding the dough displacing recess; and means concentrically registering the recess in said lid with the recess in said receptacle.

2. Structure as specified in claim 1 in which said means comprises a wall formed in depending relation along the marginal edges of said lid, said depending wall extending beyond and contiguously contacting the marginal edges of said receptacle.

References Cited
UNITED STATES PATENTS

| | | | |
|---|---|---|---|
| 1,510,279 | 9/1924 | Huth et al. | 99—439 X |
| 1,596,331 | 8/1926 | Bassett | 99—439 |
| 1,831,147 | 11/1931 | Smith | 99—439 |
| 1,854,224 | 4/1932 | Rankin | 99—88 |
| 2,091,422 | 8/1937 | Steffan et al. | 99—439 |
| 2,222,112 | 11/1940 | Miller. | |
| 2,855,305 | 10/1958 | Cella. | |
| 3,290,154 | 12/1966 | Turner | 99—88 |

WILLIAM I. PRICE, *Primary Examiner.*